UNITED STATES PATENT OFFICE.

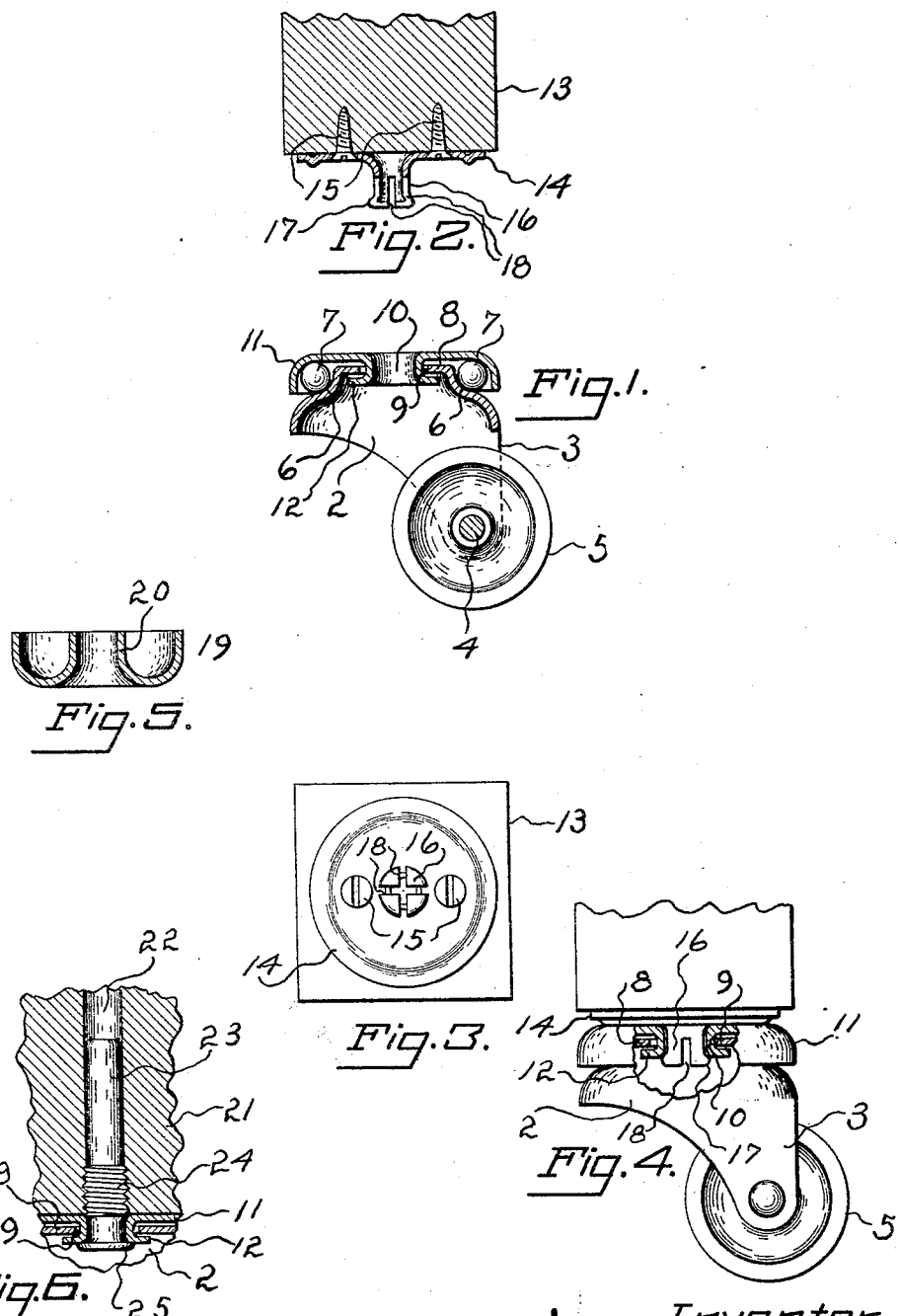

JOSIAH ALBERT JONES, OF ELMWOOD, CONNECTICUT.

CASTER.

1,304,061.   Specification of Letters Patent.   Patented May 20, 1919.

Application filed August 20, 1917. Serial No. 187,263.

*To all whom it may concern:*

Be it known that I, JOSIAH ALBERT JONES, citizen of the United States, residing at Elmwood, in the county of Hartford and State of Connecticut, have invented certain new and useful Improvements in Casters, of which the following is a specification.

This invention relates to casters, the object of the invention being to provide a simple article of this character which possesses the maximum strength, together with easy running qualities. The device involves other features of novelty and advantage which with the foregoing will be stated at length in the following description wherein I will outline in detail that form of embodiment of the invention which I have selected for illustration in the drawings accompanying and forming part of the present specification. This disclosure is primarily intended to enable those skilled in the art to practise the invention. I am not necessarily restricted thereto; I can depart therefrom in several particulars within the scope of the invention defined by the claim following said description.

Referring to said drawings:

Figure 1 is a vertical sectional view of a bracket.

Fig. 2 is a view of a furniture leg furnished with a stud.

Fig. 3 is a bottom plan view of the showing of Fig. 2.

Fig. 4 is an elevation partly in section of the complete caster shown separately by Figs. 1 and 2.

Fig. 5 is a sectional detail of a foot applicable to the stud.

Fig. 6 is a sectional view of a modification.

Like characters refer to like parts throughout the several views.

The caster involves in its make-up a bracket as 2. This bracket is preferably made from sheet metal and it has complemental arms 3 which are perforated to receive the shaft 4, the ends of the shaft being headed over for instance in the manner shown in my prior Letters Patent No. 832,794 of October 9, 1906, to which reference may be had. The shaft 4 extends through the wheel 5 which will be hereinafter more particularly described and which is shown in detail in Fig. 7. The body of the bracket 2 has externally the race 6 which receives the balls 7 of which there may be any suitable number. The upper portion of the bracket is furnished with an inwardly extending horizontal flange 8, the inner edge of which presents an opening 9 to receive the hollow rivet 10 extending downwardly centrally from the cup-shaped head 11, the inner rounded marginal surface of which presents a race complemental to the race 6 for receiving the balls 7. This holds the balls in position. The hollow rivet 10 which it will be noted extends freely through the central opening 9 is provided at its base or lower end with an outwardly extending flange 12 which underlies the inturned flange 8 already described to thus maintain the two elements of the bracket structure in assembled relation. It will be understood that the parts in question can freely relatively rotate and this in a ready free manner and comparatively noiselessly.

As will no doubt be clear the caster can be used in a wide variety of connections. I will suppose that it is associated with a leg 13 assumed to be the leg of a piece of furniture. To the leg 13 may be connected the plate or disk 14, several screws 15 being shown for the purpose, this plate and the hollow stud or rivet 16 which depends separately therefrom being generally like the other parts, drawn from sheet metal. The pendent hollow rivet, stud or pivot 16 has its lower end turned out as at 17 to constitute a locking shoulder to coact with the lower end of the hollow rivet 10 already described, the turned out portion 17 when the parts are assembled, hugging or impinging against the flanged lower end 12 of the hollow rivet 10. The hollow stud or rivet 16 is transversely resilient, and this effect can be obtained by slotting it depthwise as at 18. There are four of such slots shown and they cut through the base portion of the rivet and extend up a trifle less than half the length or depth thereof. By this circumstance I secure four resilient fingers which yield on the insertion of the hollow rivet or stud 16 into the companion rivet 10 sufficiently to permit the assemblage of the parts, and when they are properly connected, the turned out or detent portion 17 will spring over the flange 12 of the rivet 10 to hold the parts yieldingly yet satisfactorily in assembled relation as shown for instance in Fig. 4.

The foot 19 shown in detail in Fig. 5 is of drawn sheet metal and it has a central upstanding sleeve 20 which may receive the hollow stud or pivot 16 when it is desired to connect said foot with the leg 13 or otherwise.

In Fig. 6 I show a different way of connecting the wheeled bracket 2 with the leg 21 of a piece of furniture. In this case the bracket 2 is provided with the cup-shaped head 11, a counterpart of the head already described. As a matter of fact the difference between the caster shown in Fig. 6 and that previously described resides in the way the caster is connected with the leg 21 or other article. The part 21 as shown has a longitudinal bore 22 which receives the pin 23 which is usually made solid and which is provided near its lower end with threads 24 to engage threads which it makes in the wall of the bore 22. The lower end of the pin 23 extends through the opening of the hollow rivet 10 and is headed over as at 25.

What I claim is:

A caster comprising a bifurcated wheeled bracket having a race and also having an inwardly extending annular flange, a head provided with a race complemental to the other race, a series of balls in the two races, the head having a downturned flange extending freely through the opening in the other flange and provided at its lower end with a flange fitted under the other flange.

In testimony whereof I have affixed my signature in present of two witnesses.

JOSIAH ALBERT JONES.

Witnesses:
 CHARLES W. GRANT,
 WILLIAM McLAREN.

Copies of this patent may be obtained for five cents each, by addressing the "Commissioner of Patents, Washington, D. C."